(12) United States Patent
Svendsen et al.

(10) Patent No.: US 7,502,806 B2
(45) Date of Patent: Mar. 10, 2009

(54) METHOD AND SYSTEM FOR PROVIDING IMAGE RICH WEB PAGES FROM A COMPUTER SYSTEM OVER A NETWORK

(75) Inventors: Hugh B. Svendsen, Chapel Hill, NC (US); Chris Amidon, Apex, NC (US); Gary Black, Cary, NC (US); Al Issa, Apex, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 892 days.

(21) Appl. No.: 10/924,705

(22) Filed: Aug. 23, 2004

(65) Prior Publication Data

US 2006/0041554 A1    Feb. 23, 2006

(51) Int. Cl.
    *G06F 17/30*    (2006.01)
(52) U.S. Cl. .............. 707/101; 707/3; 707/9; 707/104.1
(58) Field of Classification Search ........ 707/1, 707/2–5, 9, 10, 100–102, 104.1; 709/203, 709/227
    See application file for complete search history.

(56) References Cited

U.S. PATENT DOCUMENTS

| | | | |
|---|---|---|---|
| 6,766,313 B1* | 7/2004 | Kromann | 707/2 |
| 7,028,075 B2* | 4/2006 | Morris | 709/206 |
| 2003/0063771 A1* | 4/2003 | Morris et al. | 382/100 |
| 2004/0054963 A1* | 3/2004 | Kobayashi et al. | 715/500 |
| 2004/0205168 A1* | 10/2004 | Asher | 709/220 |
| 2005/0131962 A1* | 6/2005 | Deshpande | 707/201 |

OTHER PUBLICATIONS

Davison, Brian, D., "Web Caching and Content Delivery Resource," http://www.web-caching.com, 2 pgs.

* cited by examiner

*Primary Examiner*—Cheryl Lewis
(74) *Attorney, Agent, or Firm*—Withrow & Terranova, PLLC (57) ABSTRACT

The present invention is related to a computer system that provides a web page to a requestor over a network. Aspects of the present invention include receiving by the computer system a request to access a web page and in response, determining whether a descriptor for the requested web page is in a session memory. If the descriptor is not in the session memory, it is retrieved from a database and the stored in the session memory. From there, the descriptor is used to determine whether the web page should be retrieved and returned to the requestor. By storing the descriptor in session memory, additional accesses to the database can be avoided when the descriptor is used for subsequent tasks.

49 Claims, 8 Drawing Sheets

METHOD AND SYSTEM FOR PROVIDING IMAGE RICH WEB PAGES FROM A COMPUTER SYSTEM OVER A NETWORK

FIELD OF INVENTION

The present invention relates to sharing digital images over a network, and more particularly to a method and system for providing image rich web pages from a computer system.

BACKGROUND OF THE INVENTION

Over the past several years, photosharing has become widely accepted by photo enthusiasts. Many websites currently exist that allow users to upload digital images to the site for storage on a server and for viewing by others over the Internet. Oftentimes, images are grouped to form an album web page so that the user can invite others to view the album web page, as opposed to each individual image.

This approach to photosharing, however, presents some disadvantages. In particular, users are required to upload digital images to the site, which can be time consuming, and the site requires extensive storage capacity to store the images of all the users, which can become expensive.

To address these concerns, the assignee of the present invention has developed a web-based peer-to-peer photosharing system in which all workstations and computers (peers) in the network store images locally and act as servers to other users on the network. A central site accessible by all the peers provides additional functionality, such as coordinating the peers, providing search capabilities for the peers, purchase order fulfillment, etc.

Figure 1:
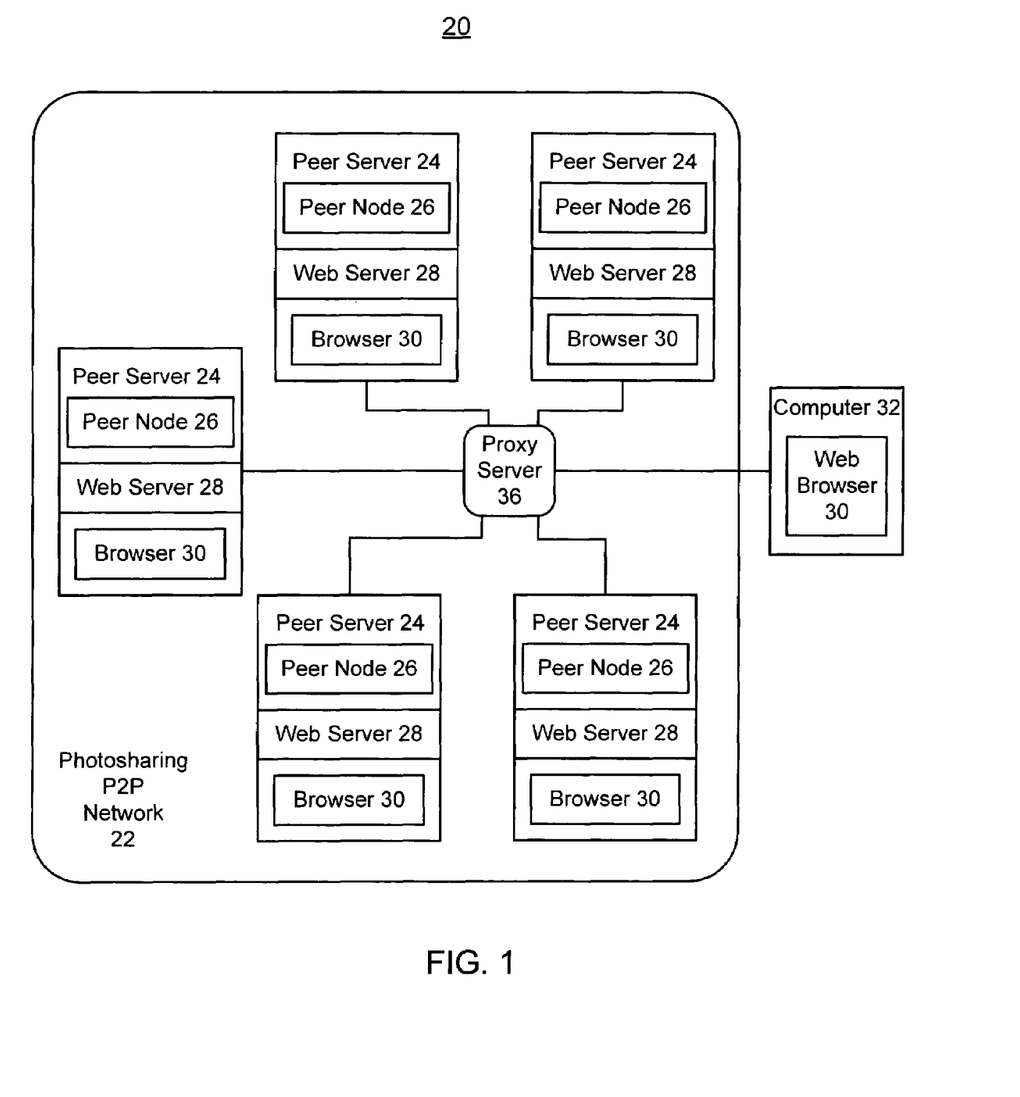
FIG. 1 is a block diagram illustrating an exemplary web-based peer-to-peer environment.

FIG. 1 is a block diagram illustrating the web-based peer-to-peer environment. The peer-to-peer environment 20 includes a photosharing P2P network 22, which comprises multiple peer servers 24 running peer node software 26 and web server software 28. The peer node and server software 24 and 26 enable the users of the computers to share images with others in the network 22 through a web browser 30 without having to upload their pictures to a web site. A proxy server 36 at a central site provides supporting services to the peers 24 as well as providing a path through which a visiting computer 32, i.e., one not belonging to the peer-to-peer network 22, accesses images from the peer servers 24 via a web browser 30. As used herein, the peer servers 24, proxy server 36 and the visiting computer 32 may comprise any computing device, such as PCs, workstations, mobile phones, and PDAs, with components necessary for executing the appropriate software. Also, in a preferred embodiment, the physical communications network is the Internet, although any type of network could be used.

Each peer 24 stores album web pages and associated images locally. Each album web page is associated with a descriptor that includes information about the album, such as which images are included in the album and who is permitted to see the album. For example, if the album is private, only the owner is allowed to view the album; if the album is "public," then everyone can access the album; and if the album is "restricted," then the album is accessible only to selected users. In this case, the descriptor includes an access list. The descriptor for each album web page is stored in a database in the peer 24.

When a peer 24 receives a request (via the proxy server 36) to access an album web page from either another peer 24 or a visiting computer 32, the peer 24 accesses the database to retrieve the descriptor associated with the requested album web page. From the descriptor, the peer 24 determines whether the requestor (e.g., peer user or user of the visiting computer) is permitted to access the album and which images are in the album web page. If the access is authorized, the peer 24 returns the album web page, which contains embedded images representing each of the album images.

Upon receipt of the album web page, the requestor's browser 30 interprets the web page and then initiates separate requests for each embedded image therein. When the peer 24 receives the request for the image, it accesses the database again to retrieve the descriptor for the album page in which the requested image resides to ensure: (1) that the requested image is actually in the associated album page; and (2) that the requestor has permission to access the album page and its contents, i.e., images.

This step is necessary to prevent unauthorized requestors from accessing protected images, because if the requestor knows the URL for an image, a request to access an image can be initiated independently from a request to access the album page in which it resides. Accordingly, for any request to access an image, the peer 24 should ensure that the requestor is authorized to access the album in which it resides. In this manner, the peer 24 supports photo sharing while honoring permission settings.

Although the process described above provides advantages over traditional photo sharing techniques, parts of the process are not optimal. In particular, each time an album is requested, the peer 24 must access the database to retrieve the descriptor associated with the requested album. Moreover, the peer 24 accesses the database to retrieve the descriptor each time an image in an album is requested. If an album contains 100 embedded images, a simple request to access and render the album web page would require 101 database accesses (one access for the album itself and 100 accesses for each image). Multiply these accesses by the number of requests for the same album page from different web servers 30 and the number of accesses quickly grows to an unmanageable level.

Accordingly, what is needed is an improved method and system for providing an image rich web page from a computer system. The method and system should accelerate access to images in an album, while honoring access restrictions to authorized requesters. The present invention addresses such a need.

BRIEF SUMMARY OF THE INVENTION

The present invention provides a method and system for providing a web page from a computer system. Aspects of the present invention include receiving by the computer system a request to access a web page and in response, determining whether a descriptor for the requested web page is in a session memory. If the descriptor is not in the session memory, it is retrieved from a database and then stored in the session memory. From there, the descriptor is used to determine whether the web page should be retrieved and returned to the requester.

According to the method and system disclosed herein, storing the descriptor for the album web page in session memory eliminates the need to access the database whenever information contained in the descriptor is needed again during the same session. By reducing the number of times the database is accessed, performance is enhanced.

DETAILED DESCRIPTION OF THE INVENTION

The present invention relates to sharing digital images over a network, and more particularly to a method and system for providing image rich web pages from a computer system. The following description is presented to enable one of ordinary skill in the art to make and use the invention and is provided in the context of a patent application and its requirements. Various modifications to the preferred embodiments and the generic principles and features described herein will be readily apparent to those skilled in the art. For example, although the preferred embodiment is in the context of a peer-to-peer network, the same principles can be applied to a client-server environment where the guest browser communicates directly with the computer system storing the album and images. Thus, the present invention is not intended to be limited to the embodiments shown but is to be accorded the widest scope consistent with the principles and features described herein.

The present invention provides a method and system for providing image rich web pages from a computer system. In the present invention, data about an album that is used to authorize a requestor and to verify that an image is in a particular album is retrieved from the database and stored in session memory if such data is not already stored in session memory. Preferably, such retrieval from the database is performed once when a first request for the album is received by a peer during a session. By storing the data about the album in session memory, subsequent requests for the data can be retrieved from session memory quickly and the need to access the database is eliminated. By reducing the number of times the database is accessed, performance is enhanced.

Figure 2:
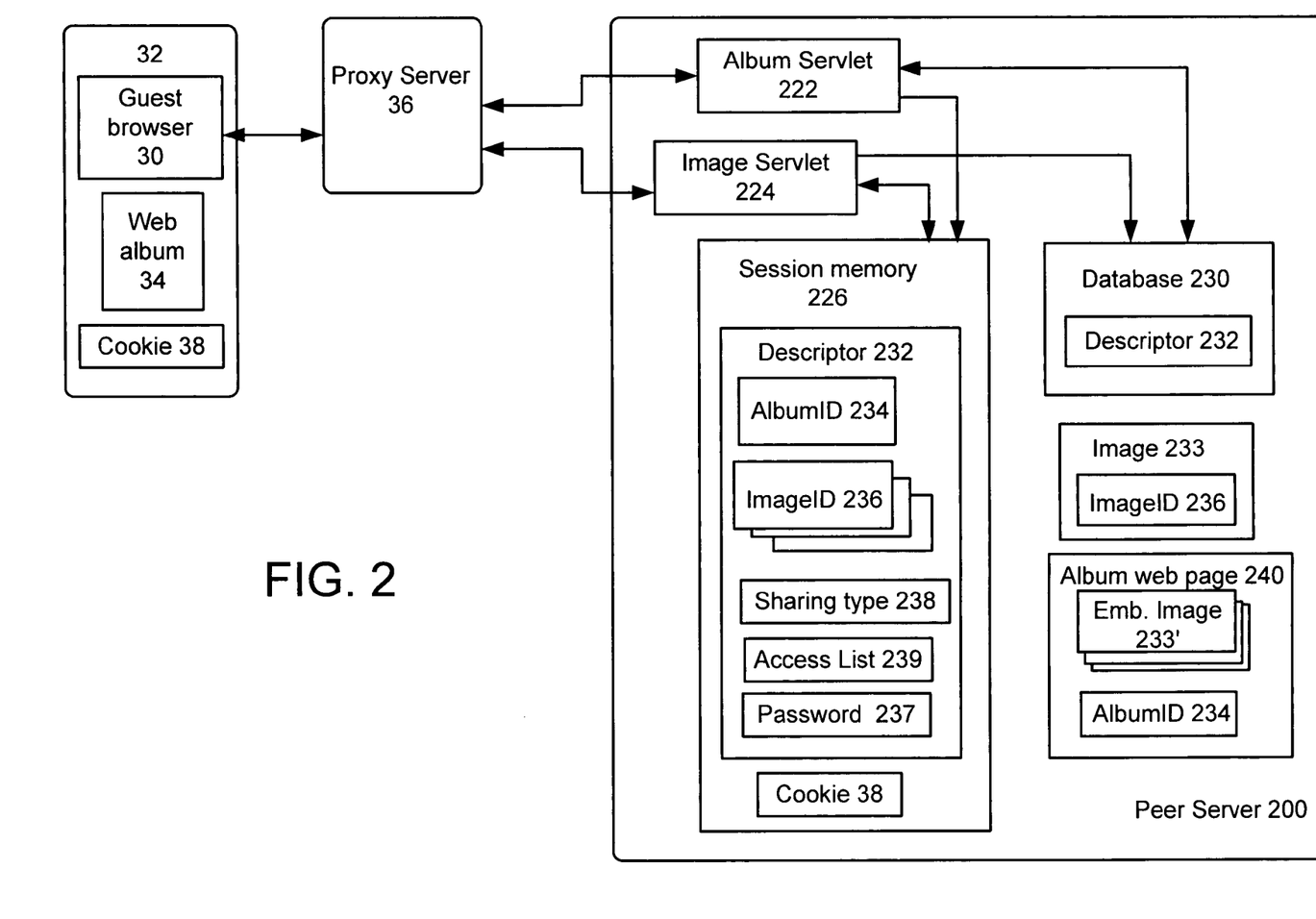
FIG. 2 is a detailed block diagram of the peer server according to a preferred embodiment of the present invention.

FIG. 2 is a detailed block diagram of an improved peer server 200 according to a preferred embodiment of the present invention, where similar components have the same reference numerals. According to the present invention, the peer server 200 includes an album servlet 222, an image servlet 224, session memory 226 and a database 230. The album servlet 222 manages a request to access an album web page 240 in the peer server 200, while the image servlet 224 manages a request to access an image 233 in an album web page 240. The database 230 stores a descriptor 232 corresponding to an album web page 240, and the session memory 226 stores a copy of the descriptor 232 corresponding to an album web page 240 when access to the album web page 240 is requested. By storing a copy of the descriptor 232 in session memory 226, the descriptor 232 can be accessed directly from memory, as opposed to being accessed from the database 230, when required. Thus, the number of times the database 230 is accessed is significantly reduced, and performance is enhanced.

Figure 3A:
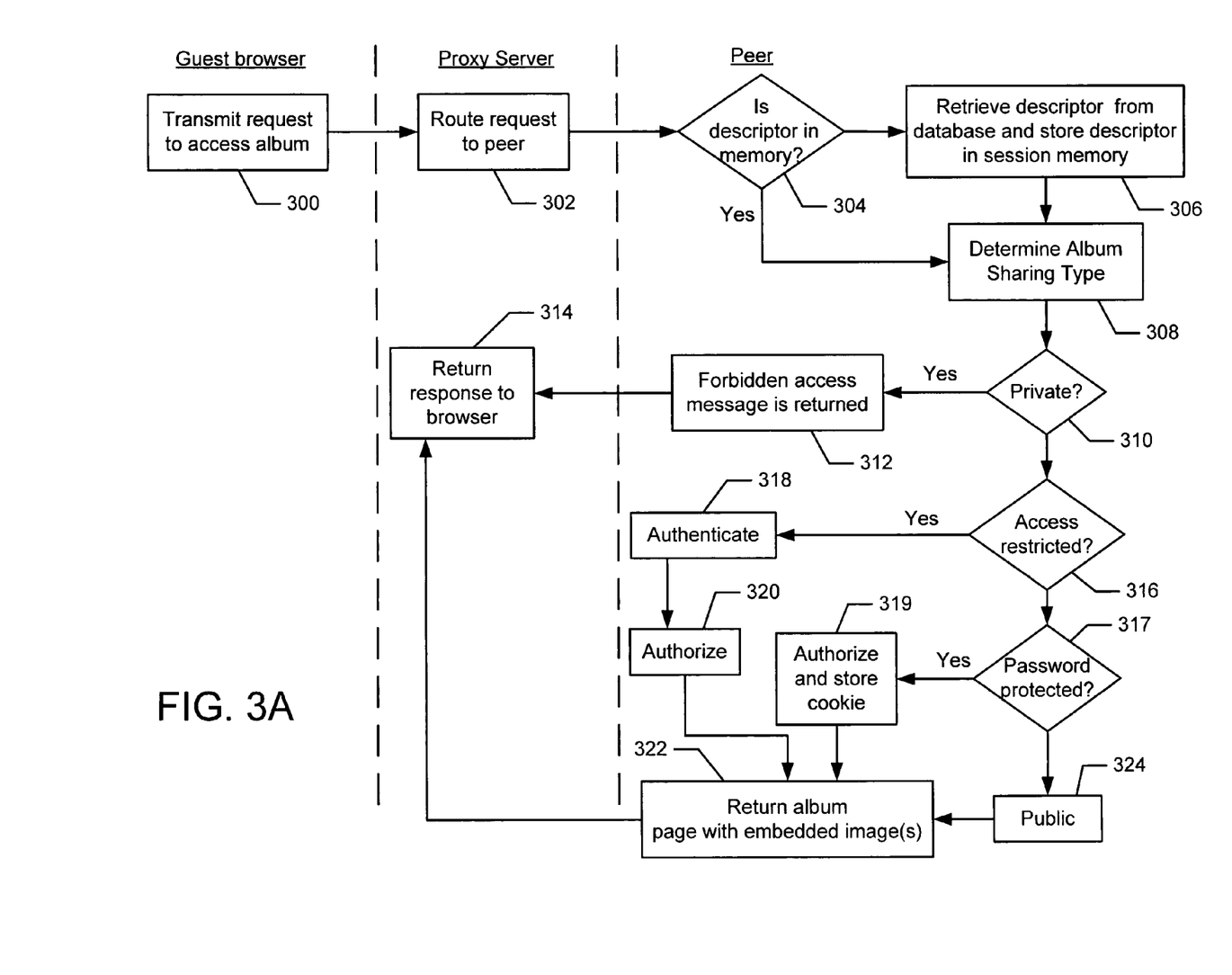
FIG. 3A is a flowchart illustrating a process for managing a request to access an image rich web page according to a preferred embodiment of the present invention.
Figure 3B:
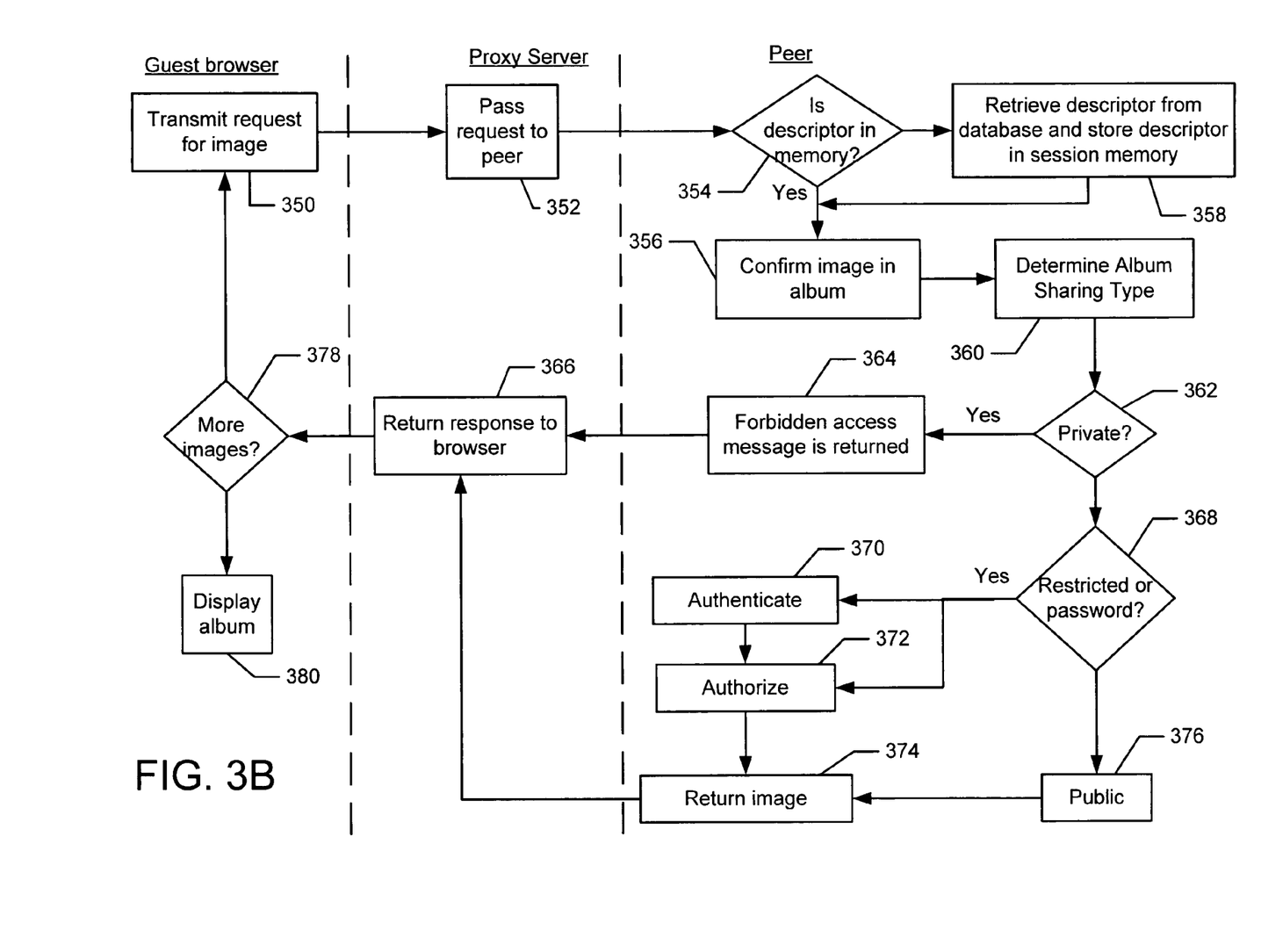
FIG. 3B is a flowchart illustrating a process for managing a request to access an image in an image rich web page according to a preferred embodiment of the present invention.

Together, FIG. 3A and FIG. 3B is a flowchart illustrating a process for providing an image rich web page according to the preferred embodiment of the present invention. Individually, FIG. 3A is a flowchart illustrating a process for managing a request to access an album web page 240, and FIG. 3B is a flowchart illustrating a process for managing a request to access an image 233 in an album web page 240 according to a preferred embodiment of the present invention.

Referring to FIG. 2 and FIG. 3A, the process for providing an image rich web page begins when the guest browser 30 transmits a request to access an album web page 240 (step 300). In a preferred embodiment, the request is a URL that identifies the peer server 200, the album servlet 222, and an album identifier 234 for the requested album web page 240. Typically, the album page's owner invites others to view the album web page 240 and provides the URL. When the URL is selected by a user of the computer 32, the web browser 30 transmits the request.

Once the request is transmitted, the proxy server 36 receives the request and routes the request to the identified peer 200 (step 302). When the peer 200 receives the request, it invokes the album servlet 222, which interprets the request and determines whether the descriptor 232 corresponding to the requested album web page 240 is stored in session memory 226 (step 304). If the descriptor 232 is not stored in memory, the album servlet 222 accesses the database 230, retrieves the descriptor 232 and stores the descriptor 232 in session memory 226 (step 306). Next, the album servlet 222 accesses the descriptor 232 from session memory 226 to determine a sharing type 238 of the album web page 240 (step 308).

The sharing type 238 of the album web page 240 defines who can access the album web page 240. In a preferred embodiment, the sharing type 238 can be one of four types: private, public, restricted and password protected. Those skilled in the art will readily appreciate that other sharing types can be implemented and the present invention is not intended to be limited to the four described below.

If the share type 238 is "private" (step 310) access to the album web page 240 is restricted to the page's owner. Thus, the album servlet 222 will return a message, e.g., an HTTP Error Code 403, denying access to the album 140 (step 312). The proxy server 36 in turn passes the response to the guest browser 30 (step 314).

If the share type is "restricted" (step 316), access to the album page 240 is limited to those listed on an access list 239. The album servlet 222 authenticates the requester (step 318) by any suitable process, for example, by requiring the requester to provide authentication data, e.g., username and password, and verifying the authentication data. Once authenticated, the album servlet 222 then authorizes the requestor (step 320) preferably by utilizing the access list 239 in, the descriptor 232 from session memory 226. Once the requestor is authorized, the album servlet 222 returns the requested album web page 240 to the proxy server 36 (step 322) and the proxy server 36 forwards the album web page 240 to the guest browser (step 314).

If the share type 238 is "password protected" (step 317), access to the album page 240 is granted only if the requestor provides the correct pass phrase or password 237. In a preferred embodiment, the album owner provides the password 237 to invitees by including it with the invitation to view the album page 140 or through any other suitable manner, i.e., an email message or the like. The album servlet 222 prompts the requestor for the password 237 and authorizes the requester (step 319) by comparing the requestor's response to the password 237 in the descriptor 232 from session memory 226. In a preferred embodiment, when the requestor is authorized, i.e., a valid password has been provided, the peer server 200 stores a cookie 38 associated with the requestor's browser 30 in session memory 226 so that for subsequent requests to access the album web page 140, the requestor will not be required to provide the password again.

By protecting the album page 140 with a password 237, an album page owner can share the album page 140 with others without requiring the invitees to register, i.e., provide authentication data. In other words, authentication is not required.

Finally, if the share type 238 of the album page 240 is "public," the album servlet 222 returns the requested album web page 240 to the proxy server 36 (step 322) and the proxy server 36 forwards the album web page 240 to the guest browser (step 314).

As stated above, the album web page 240 includes at least one embedded image 233.' Thus, after the guest browser 30 receives the album web page 240 from the proxy server 36, it interprets the page 240 and issues a separate request for each of the embedded images 233.'

Referring to FIG. 2 and FIG. 3B, the process for providing an image rich web page continues when the guest browser 30 transmits a request to access an image 233 in the album web page 240 (step 350). In a preferred embodiment, the request is a URL that identifies the peer server 200, the image servlet 224, an image identifier 236, the image size, and the album identifier 234 for the album web page 240 in which the image is embedded.

The proxy server 36 routes the request to the identified peer 200 (step 352). When the peer 200 receives the request, it invokes the image servlet 224, which interprets the request and determines whether the descriptor 232 corresponding to the album web page 240 is in session memory 226 (step 354). If the descriptor 232 is not in memory, e.g., because the request for the image 233 was transmitted without requesting access to the album page 240, the image servlet accesses the database 230, retrieves the descriptor 232 and stores the descriptor 232 in session memory 226 (step 358).

Next (or if the descriptor 232 was already in session memory 226), the image servlet 224 accesses the descriptor 232 from session memory 226 and confirms that the requested image 233 is in the album web page 240 (step 356). Preferably, if the image 233 is not in the album 240, the image servlet 224 returns a message denying access to the image 233. The image servlet 224 then determines the sharing type 238 of the album web page 240 (step 360) to determine whether the requestor is authorized to access the image 233. As stated above, this is done to prevent unauthorized requestors from accessing protected images directly, as opposed to through an album page 140.

As before, if the sharing type 238 is "private" (step 362), a message denying access to the image 233 is returned (step 364). If the sharing type is restricted or password protected (step 368), the image 233 is returned (step 374) only after the requestor has been authenticated (step 370) and/or authorized (step 372), as described above. Preferably, if the requester has been authenticated previously in the session, the authentication process need not be performed again, as is well known in the art. In addition, if the requestor previously provided a valid password and the cookie 38 for the browser 30 is in the session memory 226, the image servlet 224 does not require the requestor to provide the password 237 again. Finally, if the share type 238 is public (step 376), the image servlet 224 returns the image 233 (step 374).

The proxy server 36 receives the response from the peer 200 and forwards it to the guest browser 30 (step 366). If the album web page 240 includes more embedded images 233' (step 378), the guest browser 30 transmits another image request (step 350), and steps 352 through 366 are repeated. If all the embedded images 233' have been returned, the guest browser 30 renders the images 233 and displays the album web page 34 (step 380).

According to the preferred embodiment described above, access to the database 230 is required only if the descriptor 232 associated with an album web page 240 is not in session memory 226 and only when the requestor is authenticated for the first time in a session. Thereafter, any request to access the album web page 240 from the same or perhaps a different web browser 30 and any request to access an image 233 in an album web page 240 can be managed by accessing the descriptor 232 in session memory, as opposed to accessing the database 230. Because accessing session memory 226 is more efficient than accessing the database 230, the preferred embodiment of the present invention offers substantial cost savings in both time and resources.

Although the preferred embodiment has been described in relation to a web-based peer-to-peer network, such as that illustrated in FIG. 1, those skilled in the art would readily appreciate that the same principles can be applied to a conventional client-server environment where the computer 32 communicates directly with the peer server 200 without utilizing the proxy server 36. Moreover, the principles described could also be applied to other similar network configurations, including but not limited to the Internet.

That said, further enhancements are available in the web-based peer-to-peer network. According to a second preferred embodiment, the proxy server 36 provides additional support for the peers 200 that further improves the process for sharing image rich web pages 240.

Figure 4:
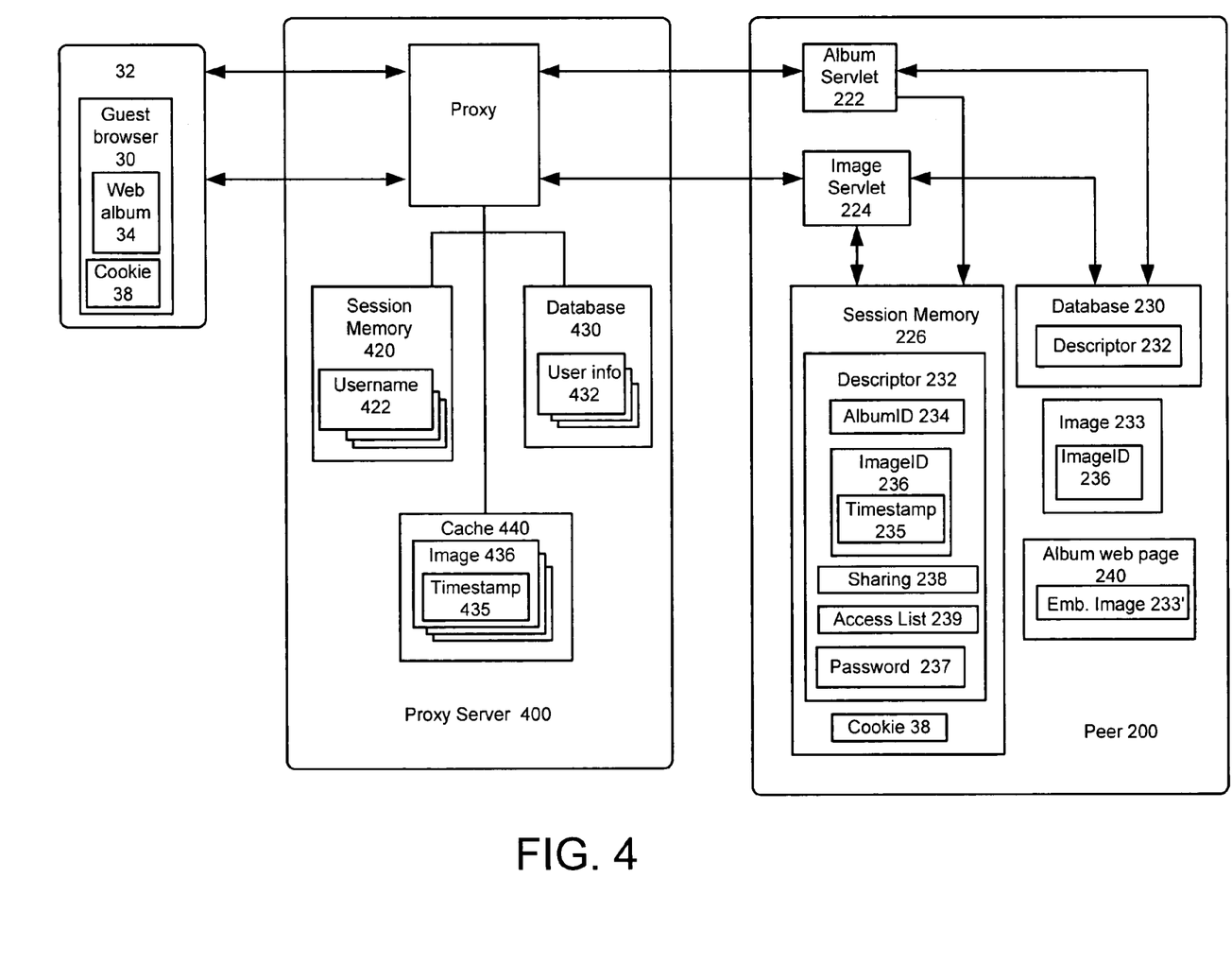
FIG. 4 is detailed block diagram of the peer server and enhanced proxy server according to a preferred embodiment of the present invention.

FIG. 4 is detailed block diagram of the peer server 200 and enhanced proxy server 400 according to another preferred embodiment of the present invention, where similar elements are identified by the same reference numerals. According to this preferred embodiment, the enhanced proxy server 400 is capable of authenticating the requestor and of serving images directly. As is shown in FIG. 4, the enhanced proxy server 400 includes session memory 420, a database 430, and cache 440. The session memory 420 stores a username 422 for each user that makes a request during a session. The database 430 includes user authentication information 432 that is used to authenticate the user who makes a request during a session. Presumably, the user authentication information 432 has been collected by either the proxy server 400 or by a peer server 200 during a registration process that takes place independently from and prior to the process described by the present invention. This registration process is well known in the art and will not be further described.

According to the preferred embodiment, the cache 440 stores images 436 that have been returned from the peer server 200 during the process for providing an image rich web page 240. An image 436 is cached according to the peer server 200 from which it originates, resolution, and image identifier 236. Preferably, an image 436 need not be cached by album identifier 234 because several album web pages 240 can include the image 436. By caching images 436 in the proxy server 400, the proxy server 400 can return a requested image 233 in an album web page 240 directly if the requested image is in cache 440 and if the cached image 436 is current. Thus, the peer server 200 is not required to access and return the image 233, which further enhances performance.

Figure 5:
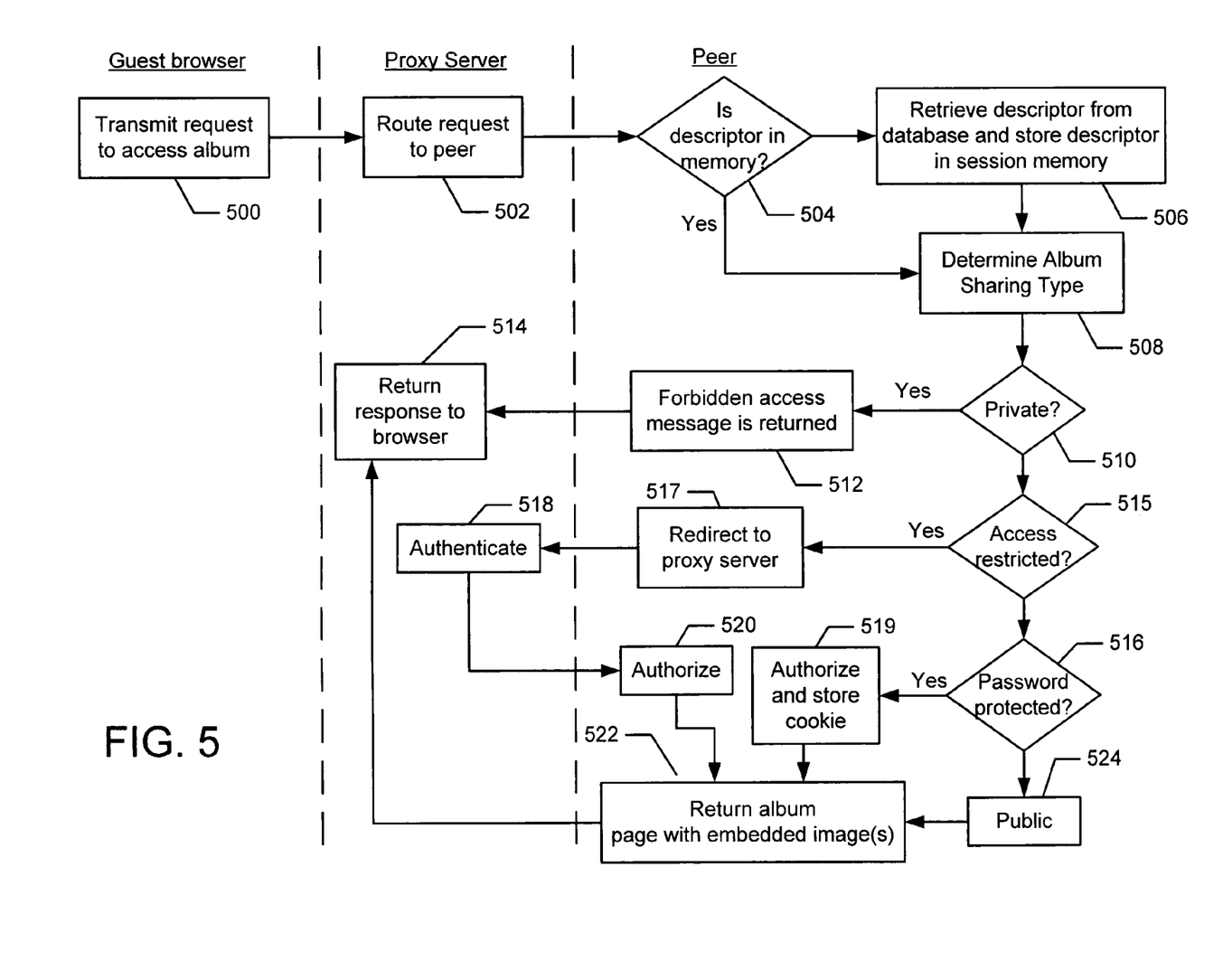
FIG. 5 is a flowchart illustrating a process for managing a request to access an image rich web page utilizing the enhanced proxy server according to a preferred embodiment of the present invention.

Together FIG. 5, FIG. 6, FIG. 7 and FIG. 8 illustrate a process for providing an image rich web page utilizing the enhanced proxy server 400 according to a preferred embodiment of the present invention. Refer first to FIG. 4 and FIG. 5.

FIG. 5 is a flowchart illustrating a process for managing a request to access an album web page according to the preferred embodiment. The process begins as usual when the guest browser transmits a request to access an album web page 240 on the peer 200 (step 500). Once the request is transmitted, the proxy server 400 receives the request and routes the request to the identified peer 200 (step 502). When the peer 200 receives the request, it invokes the album servlet 222, which interprets the request and determines whether the descriptor 232 corresponding to the requested album web page 240 is stored in session memory 226 (step 504). If the descriptor 232 is not stored in memory, the album servlet 222 accesses the database 230, retrieves the descriptor 232 and stores the descriptor 232 in session memory 226 (step 506). Next, the album servlet 222 accesses the descriptor 232 from session memory 226 to determine the sharing type 238 of the album web page 240 (step 508).

If the share type 238 is "private" (step 510), the album servlet 222 will return a message, e.g., an HTTP Error Code 403, denying access to the album 140 (step 512). The proxy server 400 in turn passes the response to the guest browser 30 (step 514).

If the sharing type is "restricted" (step 515), the album servlet 222 redirects the browser 30 to the proxy server 400 to authenticate the requestor (step 517) if the requestor has not already been authenticated during the session (discussed below). In response to receiving the redirected request, the proxy server 400 authenticates the requestor (step 518).

Figure 6:
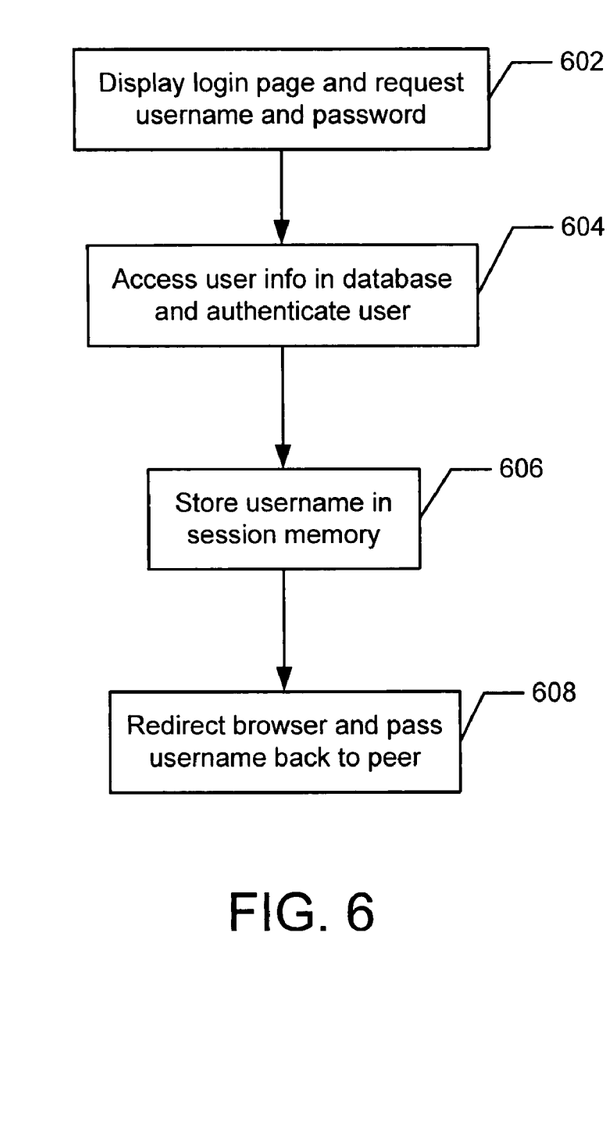
FIG. 6 is a flowchart illustrating a process for authenticating a requestor according to a preferred embodiment of the present invention.

FIG. 6 is a flowchart illustrating a process for authenticating the requestor according to a preferred embodiment of the present invention. The proxy server 400 displays a login page requiring the requestor to provide authentication information, such as a username and password (step 602). The proxy server 400 then accesses the user authentication information 432 in the database 430 to authenticate the requestor (step 604). Once the requestor is authenticated, the proxy server 400 stores the username 422 in session memory (step 606). Then the proxy server 400 redirects the browser 30 back to the peer 200 and also provides the username 422 (step 608).

In a preferred embodiment, because the requestor has been authenticated, the proxy server 400 can now attach a token to every subsequent HTTP request from the requestor/browser 30 that includes the username 422 associated with the requestor/browser 30. When the peer 200 receives the request from the proxy server 400 and interprets the username, it immediately recognizes that the requestor/browser 30 has been authenticated previously and that no further authentication is necessary.

Referring again to FIG. 5, after the requestor has been authenticated by the proxy server 400 (step 518), the peer 200 authorizes the requestor to access the album web page 240 (step 520).

Figure 7:
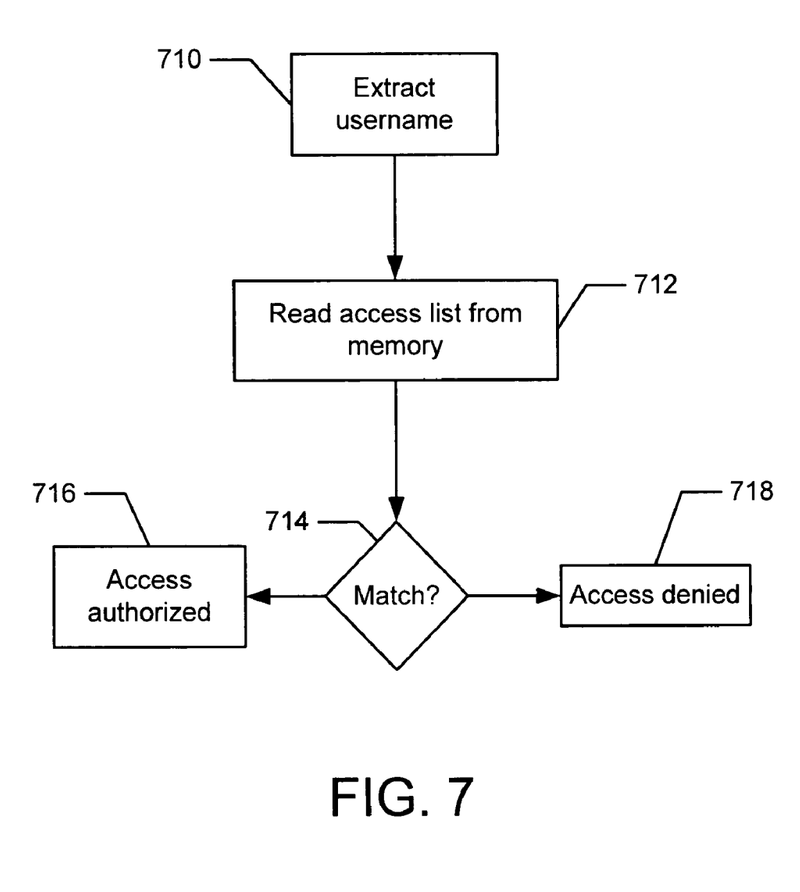
FIG. 7 is a flowchart illustrating a process for authorizing a requestor according to a preferred embodiment of the present invention.

FIG. 7 is a flowchart illustrating a process for authorizing the requestor according to a preferred embodiment of the present invention. In this case, the album servlet 222 extracts the requestor's username 422 provided by the proxy server 400 (step 710) and then reads the access list 239 associated with the requested album page 240 from session memory (step 712). If the username 422 matches a name on the access list 239 (step 714), then access is authorized (step 716). Otherwise, access to the album page 240 is denied (step 718).

Referring again to FIG. 5, if the sharing type 238 is "password protected" (step 516), the album servlet 222 prompts the requestor for the password 237 and authorizes the requester (step 519) by comparing the requestor's response to the password 237 in the descriptor 232 from session memory 226. Upon authorization, the cookie 38 associated with the requestor's browser 30 is stored in session memory 226 (step 519).

After the requestor is authorized to access the requested album page 240 (steps 519, 520), the album servlet 222 returns the requested album web page 240 to the proxy server 400 (step 522) and the proxy server 400 forwards the album web page 240 to the guest browser (step 514).

Finally, if the share type 238 of the album page 240 is "public" (step 524), the album servlet 222 returns the requested album web page 240 to the proxy server 400 (step 522) and the proxy server 400 forwards the album web page 240 to the guest browser (step 514).

As described above, after the guest browser 30 receives the album web page 240 from the proxy server 400, it interprets the page 240 and issues a separate request for each of the embedded images 233.'

Figure 8:
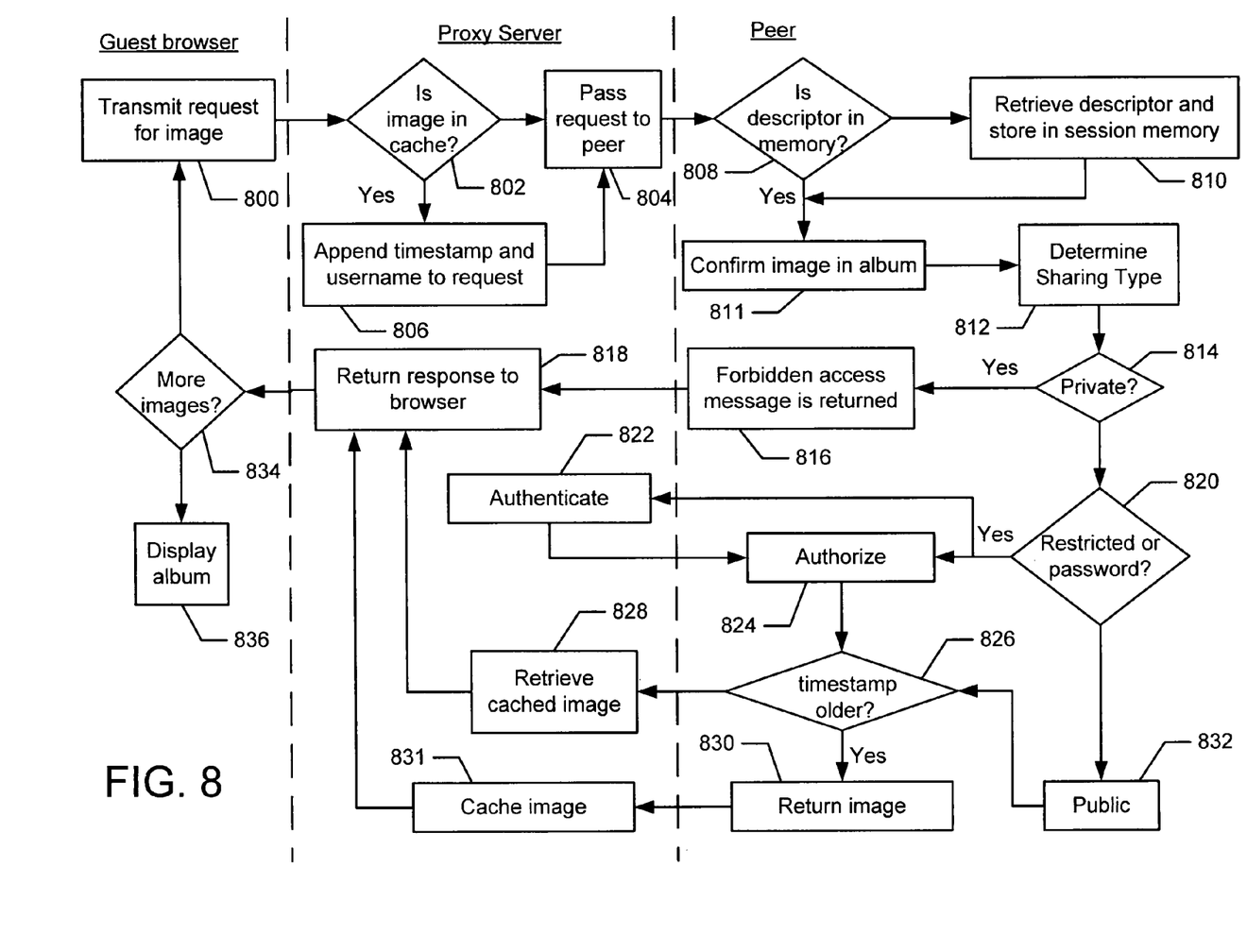
FIG. 8 is a flowchart illustrating a process for managing a request to access an image in an image rich web page utilizing the enhanced proxy server according to a preferred embodiment of the present invention.

FIG. 8 is a flowchart illustrating a process for managing a request to access an image 233 in an album web page 240 utilizing the enhanced proxy server 400 according to a preferred embodiment of the present invention. Referring to FIG. 4 and FIG. 8, the guest browser 30 transmits a request to access an image 233 in the album web page 240 (step 800). Preferably, the request is the URL described above that identifies the peer server 200, the image servlet 224, the image identifier 236, the image size, and the album identifier 234 for the album web page 240 in which the image is embedded.

The proxy server 400 receives the request and determines whether the requested image is in cache 440 (step 802) preferably by utilizing image identifer 236 in the request URL. If the requested image 233 is in cache 440, the proxy server 400 appends to the request a timestamp 435 associated with the cached image 436 (step 806). In addition, as indicated above, if the browser 30 has been authenticated previously, the token containing the username 422 is also attached to the request. The proxy server 400 routes the request to the peer 200 identified in the request URL (step 804).

When the peer 200 receives the request, it invokes the image servlet 224, which interprets the request and determines whether the descriptor 232 corresponding to the album web page 240 is in session memory 226 (step 808). If the descriptor 232 is not in memory, the image servlet 224 accesses the database 230, retrieves the descriptor 232 and stores the descriptor 232 in session memory 226 (step 810). Next (or if the descriptor 232 was already in session memory 226), the image servlet 224 accesses the descriptor 232 from session memory 226 and confirms that the requested image 233 is in the album web page 240 (step 811). Preferably, if the image 233 is not in the album web page 240, the image servlet 224 returns a message denying access to the image 233. The image servlet 224 then determines the sharing type 238 of the album web page 240 (step 812).

Once again, if the sharing type 238 is "private" (step 814), a message denying access to the image 233 is returned (step 816). If the sharing type is "restricted" or "password protected" (step 820), the image servlet 224 determines whether the requestor/browser needs to be authenticated by checking the request for a username 422. If the username 422 is found, then the requestor/browser has been authenticated previously and additional authentication is not required. If the username 422 is not found and the sharing type is "restricted," then the image servlet 224 redirects the browser 30 to the proxy server 400 for authentication (step 822), as described above in FIG. 6 and the related text.

Once the requestor/browser 30 has been authenticated or if the sharing type is "password protected," the image servlet 224 authorizes the requestor to access the album web page 240 and therefore the image 233 included therein (step 824). As before, the image servlet 224 does this either by reading the access list 239 in the descriptor 232 in session memory 226, and determining whether the requestor's username 422 is on the access list 239 (see FIG. 7), or by determining whether the cookie 38 associated with the browser 30 is present in the session memory and if not, requiring the requester to provide a valid password 237.

Once the requestor is authorized (or if the sharing type 238 is "public" (step 832)), the requestor is granted access to the image 233. If the requested image 233 is not in the proxy server's cache 440, i.e., the request does not include the timestamp 435, the image servlet 224 returns the requested image 233 from the peer server 200, as described above. If, however, the requested image 233 is in the proxy server's cache 440, the image servlet 224 determines whether the cached image 436 is the same as that image 233 stored in the peer server 200 by comparing the timestamp 435 associated with the cached image 436 with a timestamp 235 associated with the image 233 stored in the peer server 200 (step 826). Preferably, the timestamp 235 associated with the image 233 is in the descriptor 232 so that the image servlet 224 performs this step without accessing the database 230 or the image 233 itself.

If the cached timestamp 435 is older (step 826), the cached image 436 is outdated and therefore, the image servlet 224 returns the image 233 stored in the peer server 200 (step 830). If the cached timestamp 435 is not older, the cached image 436 is current and the image servlet 224 transmits a message to the proxy server 400 indicating that the image 233 content has not changed. Preferably, the message is a HTTP code 304—Content Unchanged.

If the proxy server 400 receives the HTTP code 304 message, it retrieves the cached image 436 (step 828) and returns it to the browser 30 (step 818). If, however, the proxy server 400 receives the image 233 from the peer server 200, it stores the image 233 in cache 440 (step 831) before returning the image 233 to the browser 30 (step 818).

If the album web page 240 includes more embedded images 233' (step 834), the guest browser 30 transmits another image request (step 800), and steps 802 through 832 are repeated. If all the embedded images 233' have been returned, the guest browser 30 renders the images 233 and displays the album web page 34 (step 836).

In a further embodiment of the present invention, a computer readable medium containing program instructions for providing a web page that includes at least one embedded image from a computer system over a network may be provided. The computer readable medium may include instructions, which, in response to receiving a request over the network to access the web page, determine whether a descriptor for the requested web page is stored in a session memory, where the descriptor includes information required to determine whether a requestor is authorized to access the web page and the at least one embedded image. The computer readable medium may also include instructions which, if the descriptor is not stored in session memory, retrieve the descriptor corresponding to the web page from a database and store the descriptor in session memory. In addition, the computer readable medium may include instructions, which utilize the descriptor to determine whether to return the web page, where additional database accesses are avoided for subsequent tasks requiring the descriptor. In further embodiments of the present invention, the computer readable medium may include the functionality discussed with reference to FIGS. 2 through 8.

The present invention provides a method and system for providing image rich web pages from a computer system. In the present invention, information in a descriptor associated with an album web page is retrieved from the database and stored in session memory when the album or the image is accessed for a first time in a session. By storing the descriptor in session memory, the information in the descriptor can be retrieved from session memory, as opposed to accessing the database. By reducing the number of times the database is accessed, performance is enhanced.

The present invention has been described in accordance with the embodiments shown, and one of ordinary skill in the art will readily recognize that there could be variations to the embodiments. For example, while the preferred embodiment has been described in relation to a web-based peer-to-peer network, those skilled in the art would readily appreciate that the same principles can be applied to a conventional client-server environment where the client computer communicates directly with the peer server without utilizing the proxy server. Any variations would be within the spirit and scope of the present invention. Accordingly, many modifications may be made by one of ordinary skill in the art without departing from the spirit and scope of the appended claims.

What is claimed is:

1. A method for providing a web page that includes at least one embedded image from a computer system over a network, comprising:
   receiving a request over the network to access the web page;
   in response to receiving the request, determining whether a descriptor for the requested web page is stored in a session memory, wherein the descriptor includes information required to determine whether a requestor is authorized to access the web page and the at least one embedded image;
   if the descriptor is not stored in session memory, retrieving the descriptor corresponding to the web page from a database and storing the descriptor in session memory;
   if the descriptor is stored in the session memory, utilizing the descriptor to confirm that the requested image is in the web page; and
   utilizing the descriptor to determine whether to return the web page to the requestor, wherein additional database accesses are avoided for subsequent tasks requiring the descriptor.

2. The method of claim 1 wherein the descriptor includes a sharing type that indicates a level of access associated with the web page.

3. The method of claim 2 wherein utilizing the descriptor to determine whether to return the web page further includes:
   determining the sharing type associated with the requested web page;
   if the sharing type associated with the image rich web page is a private type, returning a message denying access;
   if the sharing type is a public type, returning the web page;
   if the sharing type is a restricted type, authorizing the requestor by determining whether the requestor is on a list of users who are permitted to access the web page, wherein the list is stored in the descriptor, and retrieving and returning the web page if the requestor is on the list; and if the sharing type is a password protected type, authorizing the requestor by requiring the requestor to provide a valid password, wherein the password is stored in the descriptor, and retrieving and returning the web page if the requestor provides the valid password.

4. The method of claim 3, wherein if the sharing type is a restricted type, authenticating the requestor.

5. The method of claim 1, wherein the descriptor identifies each of the at least one images in the web page, the method further including:

receiving a request over the network to access an image in a web page;

in response to receiving the request, determining whether a descriptor for the web page is stored in session memory; and if the descriptor is stored in session memory, utilizing the descriptor to confirm that the requested image is in the web page.

6. The method of claim 5 further including if the descriptor is not stored in session memory, retrieving the descriptor from the database, and storing the descriptor in session memory.

7. The method of claim 5 further including if the requested image is not in the web page, returning a message denying access.

8. The method of claim 5 further including:

if the requested image is in the web page, utilizing the descriptor to determine whether to return the image.

9. The method of claim 8, wherein utilizing the descriptor to determine whether to return the image further includes:

determining the sharing type associated with the requested web page;

if the sharing type associated with the web page is a private type, returning a message denying access;

if the sharing type is a public type, retrieving and returning the image;

if the sharing type is a restricted type, authorizing the requestor by determining whether the requestor is on a list of users who are permitted to access the web page, wherein the list is stored in the descriptor, and retrieving and returning the image if the requestor is on the list; and if the sharing type is a password protected type, authorizing the requestor by requiring the requestor to provide a valid password, wherein the password is stored in the descriptor, and retrieving and returning the image if the requestor provides or has provided the valid password, wherein if the requestor is permitted to access the web page, the requestor is permitted to access the images therein.

10. The method of claim 9 further including providing a second computer system coupled to the computer system, wherein the second computer system includes a cache for storing images, receives requests to access web pages and images from the requestor and routes the requests to the computer system.

11. The method of claim 10 further including:

prior to routing to the computer system a request for an image in a web page, determining whether the requested image is stored in the second computer system's cache; and if the requested image is in cache, appending a timestamp associated with the cached image to the request.

12. The method of claim 11, further comprising:

prior to retrieving the image in the computer system, determining whether the timestamp of the cached image is older than a timestamp associated with the image in the computer system;

if the timestamp of the cached image is older, retrieving and returning the image in the computer system; and if the timestamp of the cached image is not older, returning a message to the second computer system indicating that the image has not changed.

13. The method of claim 12 further including:

receiving by the second computer system the message indicating that the image has not changed; and retrieving and returning the cached image to the requestor.

14. The method of claim 12 further including:

receiving by the second computer system the image from the computer system;

storing the image in cache; and returning the image to the requestor.

15. The method of claim 10, wherein the second computer system includes a second session memory and a database for storing user authentication data, the method further including:

prior to authorizing the requestor if the web page's sharing type is restricted, redirecting the request to the second computer system to authenticate the requestor;

determining by the second computer system whether authentication data for the requestor is stored in the second session memory;

if the requestor's authentication data is not stored in the second session memory, transmitting a login page to the requestor, wherein the login page includes a request for authentication data;

receiving from the requestor the requestor's authentication data;

accessing the database and utilizing the stored user authentication data to authenticate the requestor;

storing the requestor's authentication data in the second session memory;

appending the requestor's authentication data to the request; and redirecting the request back to the computer system.

16. The method of claim 15, further including:

if the requestor's authentication data is stored in session memory, appending the requestor's authentication data to the request; and redirecting the request to the computer system.

17. The method of claim 16, wherein authorizing the requestor includes:

extracting the requestor's authentication data from the request returned from the second computer system; and utilizing the requestor's authentication data to determine if the requestor is on the list of authorized users that have access to the web page.

18. The method of claim 10, wherein the network is a peer-to-peer network, the computer system is one of a plurality of a peer servers and the second computer system is a proxy server coupled to each of the plurality of peer servers.

19. A computer readable medium containing program instructions for providing a web page that includes at least one embedded image from a computer system over a network, comprising:

receiving a request over the network to access the web page;

in response to receiving the request over the network to access the web page, determining whether a descriptor for the requested web page is stored in a session memory, wherein the descriptor includes information required to determine whether a requestor is authorized to access the web page and the at least one embedded image;

if the descriptor is not stored in session memory, retrieving the descriptor corresponding to the web page from a database and storing the descriptor in session memory;

if the descriptor is stored in session memory, utilizing the descriptor to confirm that the requested image is in the web page; and utilizing the descriptor to determine whether to return the web page, wherein additional database accesses are avoided for subsequent tasks requiring the descriptor.

20. The computer readable medium of claim 19 wherein the descriptor includes a sharing type that indicates a level of access associated with the web page.

21. The computer readable medium of claim 20 wherein utilizing the descriptor to determine whether to return the web page further includes:

determining the sharing type associated with the requested web page;

if the sharing type associated with the web page is a private type, returning a message denying access;

if the sharing type is a public type, returning the web page;

if the sharing type is a restricted type, authorizing the requestor by determining whether the requestor is on a list of users who are permitted to access the web page, wherein the list is stored in the descriptor, and retrieving and returning the web page if the requestor is on the list; and if the sharing type is a password protected type, authorizing the requestor by requiring the requestor to provide a valid password, wherein the password is stored in the descriptor, and retrieving and returning the web page if the requestor provides the valid password.

22. The computer readable medium of claim 21 wherein if the sharing type is a restricted type, authenticating the requestor.

23. The computer readable medium of claim 19 wherein the descriptor identifies each of the at least one images in the web page, further including instructions for:

receiving a request over the network to access an image in a web page;

in response to receiving the request, determining whether a descriptor for the web page is stored in session memory; and if the descriptor is stored in session memory, utilizing the descriptor to confirm that the requested image is in the web page.

24. The computer readable medium of claim 23 further including if the descriptor is not stored in session memory, retrieving the descriptor from the database, and storing the descriptor in session memory.

25. The computer readable medium of claim 23 further including if the requested image is not in the web page, returning an message denying access.

26. The computer readable medium of claim 23 further including if the requested image is in the web page, utilizing the descriptor to determine whether to return the image.

27. The computer readable medium of claim 26, wherein utilizing the descriptor to determine whether to return the image further includes:

determining the sharing type associated with the requested web page;

if the sharing type associated with the web page is a private type, returning a message denying access;

if the sharing type is a public type, returning the image;

if the sharing type is a restricted type, authorizing the requestor by determining whether the requestor is on a list of users who are permitted to access the web page, wherein the list is stored in the descriptor, and retrieving and returning the image if the requestor is on the list; and if the sharing type is a password protected type, authorizing the requestor by requiring the requestor to provide a valid password, wherein the password is stored in the descriptor, and retrieving and returning the image if the requestor provides the valid password, wherein if the requestor is permitted to access the web page, the requestor is permitted to access the images therein.

28. The computer readable medium of claim 27 further including providing a second computer system coupled to the computer system, wherein the second computer system includes a cache for storing images, receives requests to access web pages and images from the requestor and routes the requests to the computer system.

29. The computer readable medium of claim 28 further including:

prior to routing to the computer system a request for an image in a web page, determining whether the requested image is stored in the second computer system's cache; and if the requested image is in cache, appending a timestamp associated with the cached image to the request.

30. The computer readable medium of claim 29, further comprising:

prior to retrieving the image in the computer system, determining whether the timestamp of the cached image is older than a timestamp associated with the image in the computer system;

if the timestamp of the cached image is older, retrieving and returning the image in the computer system; and if the timestamp of the cached image is not older, returning a message to the second computer system indicating that the image has not changed.

31. The computer readable medium of claim 30 further including:

receiving by the second computer system the message indicating that the image has not changed; and retrieving and returning the cached image to the requestor.

32. The computer readable medium of claim 30 further including:

receiving by the second computer system the image from the computer system;

storing the image in cache; and returning the image to the requestor.

33. The computer readable medium of claim 28 wherein the second computer system includes a second session memory and a database for storing user authentication data, the method further including:

prior to authorizing the requestor if the web page's sharing type is restricted, redirecting the request to the second computer system to authenticate the requestor;

determining by the second computer system whether authentication data for the requestor is stored in the second session memory;

if the requestor's authentication data is not stored in the second session memory, transmitting a login page to the requestor, wherein the login page includes a request for authentication data;

receiving from the requestor the requestor's authentication data;

accessing the database and utilizing the stored user authentication data to authenticate the requestor;

storing the requestor's authentication data in the second session memory; appending the requestor's authentication data to the request; and redirecting the request back to the computer system.

34. The computer readable medium of claim 33, further including:
if the requestor's authentication data is stored in session memory, appending the requestor's authentication data to the request; and
redirecting the request to the computer system.

35. The computer readable medium of claim 34, wherein authorizing the requestor includes:
extracting the requestor's authentication data from the request returned from the second computer system; and
utilizing the requestor's authentication data to determine if the requestor is on the list of authorized users that have access to the web page.

36. The computer readable medium of claim 28, wherein the network is a peer-to-peer network, the computer system is one of a plurality of a peer servers and the second computer system is a proxy server coupled to each of the plurality of peer servers.

37. A computer system coupled to a network comprising:
a plurality of web pages each of which include at least one embedded image that corresponds to an image stored in the computer system;
a database for storing a descriptor corresponding to each of the plurality of web pages, wherein the descriptor includes information required to determine whether a requestor is authorized to access the web page and the at least one embedded image;
a session memory for temporarily storing data during a session;
means for receiving a request over the network to access a web page;
a first application servlet for determining whether a descriptor for the requested web page is stored in a session memory, wherein if the descriptor is not stored in session memory, the first application servlet retrieves the descriptor corresponding to the requested web page from the database and stores the descriptor in session memory, and utilizes the descriptor to determine whether to return the web page; and
if the descriptor is stored in session memory, utilizing the descriptor to confirm that the requested image is in the web page.

38. The computer system of claim 37, wherein the descriptor includes a sharing type that indicates a level of access associated with the web page and wherein the first application servlet determines whether to return the web page based on the sharing type associated with the requested web page.

39. The computer system of claim 38, wherein if the sharing type associated with the web page is a private type, the first application servlet returns a message denying access, if the sharing type is a public type, the first servlet retrieves and returns the web page, if the sharing type is a restricted type, the first servlet determines whether a requestor is authorized to access the web page via a list of authorized users stored in the descriptor and if the requestor is authorized, retrieves and returns the web page, and if the sharing type is a password protected type, the first servlet authorizes the requestor by requiring the requestor to provide a valid password, wherein the password is stored in the descriptor, and if the requestor provides the valid password, retrieves and returns the web page.

40. The computer system of claim 37 further comprising:
means for receiving a request over the network to access an image in a web page; and
a second application servlet for managing the request to access the image.

41. The computer system of claim 40, wherein the second application servlet manages the request by determining whether a descriptor for the web page is stored in session memory, wherein if the descriptor is not stored in session memory, the second application servlet retrieves the descriptor from the database and stores the descriptor in session memory, and utilizing the descriptor stored in session memory to confirm that the requested image is in the web page.

42. The computer system of claim 41, wherein if the requested image is not in the web page, the second servlet returns a message denying access.

43. The computer system of claim 41, wherein if the image is in the web page, the second application servlet determines whether to retrieve and return the image based on a sharing type associated with the requested web page.

44. A peer-to peer network comprising:
a proxy server;
a plurality of a peer servers coupled to the proxy server, wherein at eat one of the plurality of peer servers includes:
a plurality of web pages each of which include at least one embedded image that corresponds to an image stored in the computer system;
a database for storing a descriptor corresponding to each of the plurality of web pages, wherein the descriptor includes information required to determine whether a requestor is authorized to access the web page and the at least one embedded image;
a session memory for temporarily storing data during a session;
a first application servlet for managing a request to access a web page, wherein the proxy server receives the request to access a web page and routes the request to the appropriate peer server, and the first application servlet determines whether a descriptor for the requested web page is stored in the session memory, wherein if the descriptor is not stored in session memory, the first application servlet retrieves the descriptor corresponding to the requested web page from the database and stores the descriptor in session memory, and utilizes the descriptor to determine whether to return the web page; and
if the descriptor is stored in session memory, utilizing the descriptor to confirm that the requested image is in the web page.

45. The peer-to-peer network of claim 44, wherein the proxy server includes:
a cache for storing images;
a session memory for temporarily storing data for a session; and
a database for storing user authentication data,
wherein when the proxy server receives a request to access an image in a web page from a requestor, the proxy server determines whether the requested image is stored in the cache, and if the requested image is in the cache, appends a timestamp associated with the cached image to the request before routing the request to the appropriate peer server.

46. The peer-to-peer network of claim 45, wherein the peer server further includes:

a second application servlet for managing a request to access an image in a web page, wherein when the peer server receives the request to access the image, the second application servlet determines whether a descriptor for the web page is stored in session memory, wherein if the descriptor is stored in session memory, the second application servlet utilizes the descriptor to confirm that the requested image is in the web page and to determine whether to retrieve and return the image.

47. The peer-to-peer network of claim 46, wherein if the image is retrieved, the second application servlet determines whether the timestamp of the cached image is older than a timestamp associated with the retrieved image, returns the retrieved image to the proxy server if the timestamp of the cached image is older, and returns a message to the proxy server indicating that the image has not changed if the timestamp of the cached image is not older.

48. The peer-to-peer network of claim 47, wherein if the proxy server receives a message indicating that the image has not changed, the proxy server retrieves and returns the cached image to the requestor, and if the proxy server receives an image from the peer server, the proxy server stores the image in cache before returning the image to the requestor.

49. A method for providing a web page that includes at least one embedded image from a computer system over a network, wherein the computer system includes a session memory and a database, the method comprising:
  in response to receiving a first request in a session to access the web page, retrieving from the database and storing in the session memory authorization information associated with the web page;
  reading the authorization information from session memory to determine whether a requestor has permission to access the web page;
  retrieving the authorization information from session memory during a subsequent request in the session to access the web page, thereby improving performance by reducing the need to access the database; and
  if the descriptor is stored in session memory, utilizing the descriptor to confirm that the requested image is in the web page.

* * * * *

UNITED STATES PATENT AND TRADEMARK OFFICE
CERTIFICATE OF CORRECTION

PATENT NO. : 7,502,806 B2
APPLICATION NO. : 10/924705
DATED : March 10, 2009
INVENTOR(S) : Hugh Svendsen

Page 1 of 1

It is certified that error appears in the above-identified patent and that said Letters Patent is hereby corrected as shown below:

<u>Claim 44, Column 16</u>
Line 25, change
"eat"
to
--least--

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,502,806 B2 |
| APPLICATION NO. | : 10/924705 |
| DATED | : March 10, 2009 |
| INVENTOR(S) | : Hugh B. Svendsen et al. |

It is certified that error appears in the above-identified patent and that said Letters Patent is hereby corrected as shown below:

On the Title page of the patent, change the Assignee's name from "Quiro" to --Qurio--.

Signed and Sealed this
Eleventh Day of October, 2011

David J. Kappos
*Director of the United States Patent and Trademark Office*